United States Patent [19]
Allen

[11] Patent Number: 4,676,457
[45] Date of Patent: Jun. 30, 1987

[54] AIRCRAFT EMERGENCY LANDING SYSTEM

[76] Inventor: Sebree J. Allen, Rte. #2, Kevil, Ky. 42503

[21] Appl. No.: 622,886

[22] Filed: Jun. 21, 1984

[51] Int. Cl.[4] ............................................. B64D 25/00
[52] U.S. Cl. ................................... 244/17.15; 244/139
[58] Field of Search ............... 244/17.15, 17.17, 23 A, 244/100 R, 138 R, 139, 140, 113, 110 R

[56] References Cited

U.S. PATENT DOCUMENTS

| | | | |
|---|---|---|---|
| 2,395,435 | 2/1946 | Thompson et al. | 244/52 |
| 3,138,348 | 6/1964 | Stahmer | 244/17.15 |
| 3,156,442 | 11/1964 | Pourchet | 244/138 R |

FOREIGN PATENT DOCUMENTS

| | | | |
|---|---|---|---|
| 197808 | 8/1978 | Fed. Rep. of Germany | 244/138 R |
| 1237101 | 6/1960 | France | 244/138 R |
| 1237189 | 6/1971 | United Kingdom | 244/139 |

Primary Examiner—Galen Barefoot
Attorney, Agent, or Firm—Harrington A. Lackey

[57] ABSTRACT

An emergency landing system for an aircraft, particularly a helicopter, in which a plurality of rocket members are mounted on the fuselage of the aircraft and directed downward about the center of gravity of the fuselage. The rocket members are activated to direct upward reactive forces by the energization of a proximity switch located on the fuselage and adapted to sense the ground level when the fuselage has descended within a predetermined elevation above the ground level so that the downward movement of a disabled aircraft is substantially decelerated to provide a soft landing for the aircraft. The landing system may be adapted for use on a fixed wing aircraft by directing the rocket members to exert reactive forces rearward as well as upward to retard the forward as well as downward movement of a disabled fixed wing aircraft.

4 Claims, 3 Drawing Figures

AIRCRAFT EMERGENCY LANDING SYSTEM

BACKGROUND OF THE INVENTION

This invention relates to aircraft, and more particularly to an emergency landing system for an aircraft, and particularly a helicopter.

Because of the nature and structure of helicopters, a disabled helicopter, and particularly a helicopter having a disabled rotor or rotor blades, is highly susceptible to a crash, disastrous, not only to the helicopter itself, but to the personnel within the helicopter. Because of the absence of fixed wings on the fuselage of a helicopter, the ability of the helicopter to glide to safety is prohibited. Although the descent of a helicopter in which the rotor engine has failed, may result in reverse rotation or "wind-milling" of the blades, nevertheless, such a reverse rotor effect is not sufficient to prevent damaging impact of the helicopter when it reaches the ground.

Some examples of attempts at escape means for helicopters and their personnel are disclosed in the following U.S. patents:

U.S. Pat. No. 3,220,015; Larsen, et al.; Dec. 7, 1965
U.S. Pat. No. 3,352,513; Baker, et al.; Nov. 14, 1967
U.S. Pat. No. 3,377,037; Stewart; Apr. 9, 1968

In each of the above patents, the escape system involves the ejection of the personnel from the helicopter, or the ejection of an encapsulated portion or pod of the helicopter from the main fuselage and subsequent parachuting of the personnel or encapsulated pod to safety, with the ultimate destruction of the remaining portion of the helicopter fuselage.

Applicant is not aware of any emergency landing system for an aircraft, and particularly for a helicopter, in which the entire helicopter, as well as the personnel, are salvaged when the helicopter is disabled, and particularly when the power to the rotor blades fails.

SUMMARY OF THE INVENTION

This invention relates to an emergency landing system for an aircraft, and particularly to an emergency landing system for a helicopter, in which a plurality of rocket members are mounted at spaced locations upon the fuselage of the aircraft about its center of gravity and with the discharge ends of the rocket members directed downwardly. The rocket members are provided with ignition means which are activated simultaneously by a proximity switch to create powerful upward thrusts in opposition to the action of gravity upon the fuselage. The proximity switch preferably senses the ground at a predetermined level or elevation above the ground level to substantially decelerate the downward movement of the helicopter to produce a soft landing for the helicopter.

Preferably, the rocket members are spaced about the center of gravity so that the downward thrusts of the rockets create a total force moment of zero about the center of gravity to stabilize the helicopter as it descends toward the ground for landing. The rocket members may be equally spaced from, and circumferentially of, the center of gravity when the propellent thrust of each rocket is substantially uniform. Where the force of some of the rockets is greater than others, the rockets with greater thrusts may be spaced corresponding lesser distances from the center of gravity so that the sum of the force moments are equal and opposite, and therefore equal zero.

A control switch may be provided for arming and disarming the proximity switch so that the proximity switch will be in an inoperative mode when the helicopter is functioning normally and able to land under the power of its normally functioning rotor blades and engine. However, in an emergency situation, the control switch may be activated to arm the proximity switch when the disabled helicopter descends to a predetermined elevation above the ground level to discharge the rockets. The control switch may be operated manually, or it may be operatively connected to sense the malfunction of an operating part of the helicopter, such as the rotation of the rotor shaft.

DESCRIPTION OF THE PREFERRED EMBODIMENTS

Figure 1:
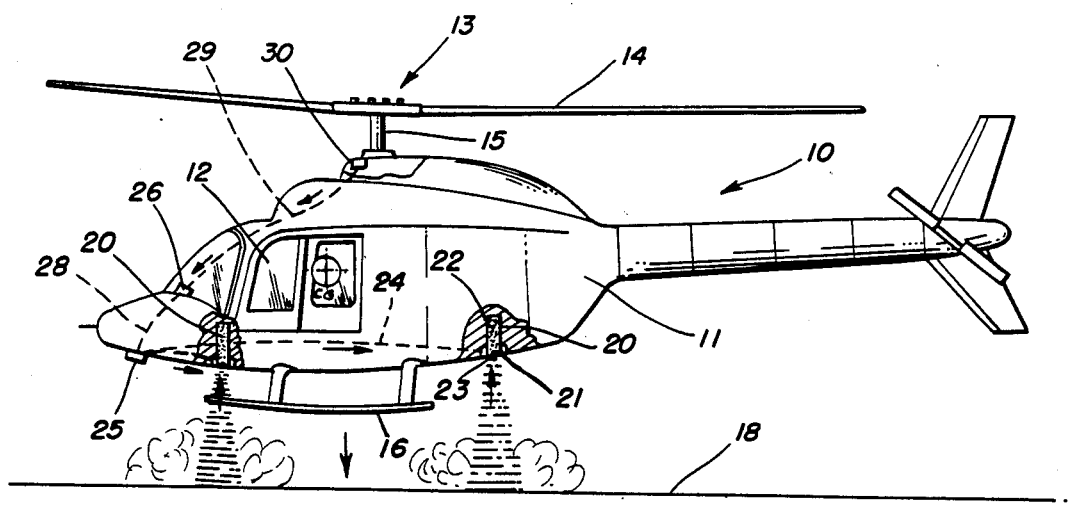
FIG. 1 is a side elevational view of a conventional helicopter provided with the emergency landing system made in accordance with this invention, and showing the rocket members actuated to produce an upward reactive force to permit the helicopter to land safely.
Figure 2:
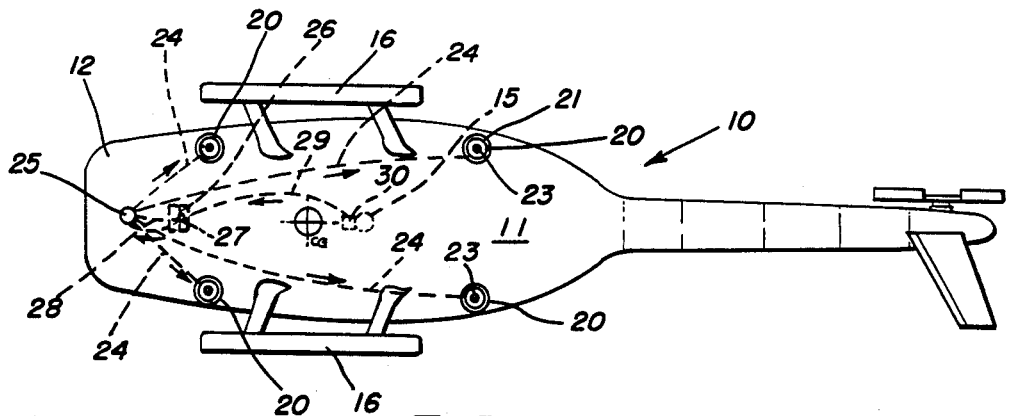
FIG. 2 is a bottom plan view of the helicopter and the landing system disclosed in FIG. 1.

Referring now to the drawings in more detail, FIGS. 1 and 2 disclose a conventional helicopter 10 including a fuselage 11 enclosing a control cabin 12 and having a rotor 13 including propeller blades 14 and a rotor shaft 15. The rotor shaft 15 is driven by an engine, not shown, contained within the fuselage 11. Depending from the bottom of the fuselage 11 are a pair of landing skids 16.

The center of gravity of the fuselage 11 is indicated at CG, and the ground level or other landing surface upon which the skids 16 rest in a landed position is indicated at 18 (FIG. 1).

The emergency landing system made in accordance with this invention includes a plurality of rocket members 20 (four disclosed in FIG. 2) mounted in the fuselage 11 and spaced on opposite sides of the center of gravity CG. The spacing of the rocket members 20 is such that, when the forces exerted by the respective rocket members 20, and the respective distances of the rocket members 20 from the center of gravity CG, are balanced, the upward thrusts exerted by the rocket members 20 tend to neutralize the force of gravity upon the helicopter 10, and the sum of the force moments about the center of gravity CG equals zero. In other words the rocket members 20 are so located about the center of gravity CG, that the helicopter 10 descending solely by the force of gravity, will be stabilized in its same attitude relative to the ground level 18, to permit the helicopter 10 to land safely upon the ground level 18 in a normal landing attitude.

The rocket members 20 may be cylindrical canisters closed at their upper ends and having open bottom discharge ends 21. The rocket canisters 20 may receive a rocket propellent charge 22 of any known composition. An electrical or electronic ignition device, detonator, cap, or primer 23 may be secured adjacent the open discharge end 21 in any conventional manner for properly igniting the propellent charge 22 when the primer 23 is energized. Preferably, the rocket canisters 20 are mounted within the fuselage 11 so that they are substantially parallel to each other and to the line of force of gravity acting upon the fuselage 11 in its normal operational attitude.

Each of the ignition primers 23 is connected by a corresponding electrical lead 24, in parallel, to a proximity switch device 25. The proximity switch device 25 is located in the fuselage 11, and preferably in the bottom portion of the fuselage with an unobstructed space between the proximity switch device 25 and the ground level 18.

The proximity switch device 25 may be any of several conventional type proximity switch devices, such as those operating upon the principle of emitting and receiving sound waves, radio waves or light waves. The proximity switch device 25 will be pre-set to switch or shift from an inoperative mode, that is with the switch open, and an operative mode in which the proximity switch 25 is closed to transmit current from a control module 26, having a source of electrical power, not shown, to the ignition primers 23 in the direction of the arrows, to activate simultaneously the rocket members 20.

The control module 26 may include a manually actuable switch 27 (FIG. 2) which may be utilized to arm or disarm the proximity switch device 25 through lead 28. When the proximity switch device 25 is disarmed by the manual switch 27, the landing system will not be actuated under any circumstances. In other words, as long as the helicopter 10 is operating satisfactorily, the rocket members 20 will not be actuated to produce any rocket thrusts.

On the other hand, when the switch 27 is actuated, such as in the case of an emergency when the pilot or operator of the helicopter 10 has determined that the helicopter 10, and particularly the rotor 13, has become disabled, the proximity switch device 25 will be armed. Accordingly, when the proximity switch 25 senses the pre-set altitude of the fuselage 11 above the ground level 18, it will immediately shift to its operative mode to activate the ignition primers 23 and ignite the propellent charges 22 to create simultaneous upward thrusts from each of the rocket members or motors 20. The energization of the rocket motors 20 creates the desired upward reactive forces opposing the downward force of gravity to substantially decelerate the downward movement of the helicopter 10 to gradually lower the helicopter 10 to a landing position upon the ground level 18.

In lieu of the manual switch 27, the control module 26 may be connected through a lead 29 to a rotor sensor 30 which senses the rotary movement of the rotary shaft 15. As long as this rotor member 15 is rotating, a sensed signal will maintain the proximity switch device 25 in a disarmed attitude. However, once the rotor 15 ceases to rotate, the sensor switch 30 will transmit a signal through the lead 29 and control module 26 to the proximity switch device 25 to arm the proximity switch 25. Thus, when the proximity switch 25 senses the pre-set critical altitude or elevation, again the rockets 20 will immediately be fired to create the decelerating force and permit the helicopter 10 to have a soft landing upon the ground level 18.

Figure 3:
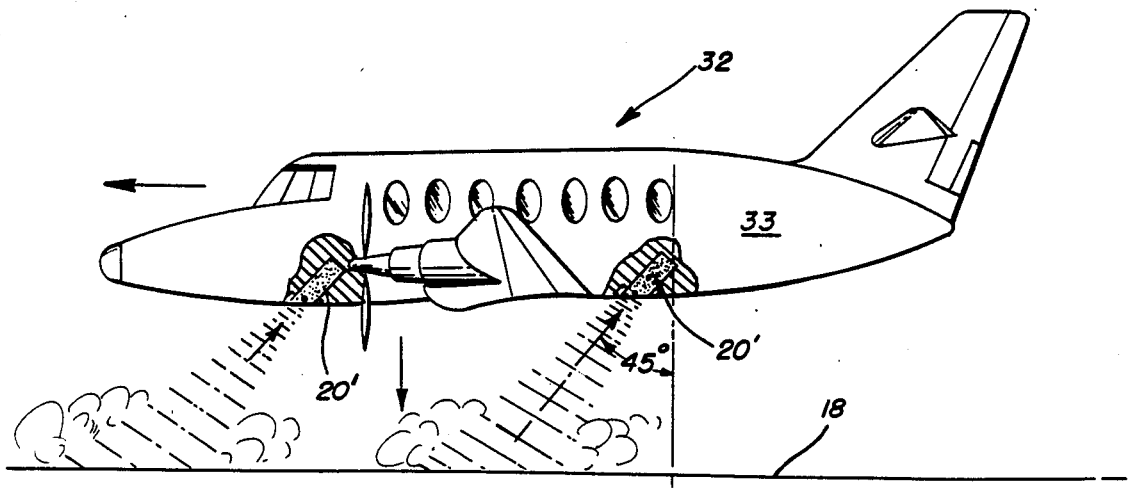
FIG. 3 is a side elevational view of a modified landing system in operative position upon a fixed wing aircraft.

FIG. 3 discloses a fixed wing aircraft 32 including a fuselage 33 having rocket members 20', which may be identical to the rocket members 20. However, the rocket members 20' are mounted in the fuselage 33 at an angle to the vertical, such as 45° as disclosed in FIG. 3. Thus, when the fixed wing aircraft 32 becomes disabled and the rocket members 20' are ignited by a system similar to that disclosed in FIGS. 1 and 2, exhaust gases of the rocket members 20' will be directed forwardly as well as downward to produce opposite reactive forces to neutralize or oppose the resultant force created by the gravitational and inertial components acting on the aircraft. Thus, the reactive forces of the rocket members 20' decelerate the aircraft 32 to retard its forward and downward movements in order to create a soft landing for the aircraft 32.

The propulsive force of each of the rocket motors 20 and 20', as well as the number of rocket motors 20, and 20' utilized in the landing system will depend upon the mass or weight of the helicopter 10 or the aircraft 32, in order to achieve the desired resultant reactive forces which will decelerate the downward movement of the helicopter 10 or aircraft 32, so that upon landing the desired net gravitational force upon the craft will be substantially 0G.

It is also within the scope of this invention to provide an emergency landing system incorporating a single rocket motor having a downward direction of thrust in vertical alignment with the center of gravity of the helicopter 10.

It is also within the scope of this invention to provide a single rocket charber having a plurality of discharge tubes or jets connected to the chamber, the discharge ends of which are spaced apart in a configuration as a plurality of individual rocket motors, such as the motor 20.

It is therefore apparent that an emergency landing system has been provided for heavier-than-air aircraft, and particularly for helicopters, which will be automatically activated in the case of an emergency, after the aircraft has descended to a predetermined elevation or altitude, to permit a soft landing. The landing system made in accordance with this invention will thus, salvage the entire aircraft, as well as its personnel, without loss of any part of the aircraft.

What is claimed is:

1. An emergency landing system for a helicopter, comprising:
    (a) a helicopter fuselage having top and bottom surfaces and a center of gravity,
    (b) a plurality of rocket members, each having a discharge end and a rocket actuator for creating a reactive force,
    (c) means mounting said rocket members on said fuselage at spaced intervals about said center of gravity so that said discharge ends are directed downward,
    (d) proximity switch means on said fuselage adapted to sense the ground level below said fuselage and having operative and inoperative modes, said switch means being in an operative mode when said switch means senses the ground level within a pre-determined elevation of said switch means above said ground level, and said switch means being in an inoperative mode when said switch means is above said pre-determined elevation,
    (e) means operatively connecting said proximity switch means to each of said rocket actuators for creating substantially simultaneous upward reactive forces, substantially parallel and vertical, when said proximity switch means is in said operative mode, to solely and substantially decelerate the downward movement of said helicopter fuselage to produce a soft landing, without the assistance of a parachute, (f) said spaced intervals and said reactive forces being of such values that the sum of the force-moments about said center of gravity equals zero, and (g) control switch means for selectively arming or disarming said proximity switch means, whereby arming said proximity switch means places said proximity switch means in said operative mode when said proximity switch means is within said predetermined elevation, and places said proximity switch means in said inoperative mode when said proximity switch means is above said pre-determined elevation, and whereby disarming said proximity switch means places said proximity switch means continuously in said inoperative mode.

2. The invention according to claim 1 in which said helicopter fuselage has a rotor shaft, said control switch means sensing the rotation of said rotor shaft whereby said proximity switch means is disarmed while said rotor shaft is rotating, and is armed when said rotor shaft is not rotating.

3. The invention according to claim 1 in which said control switch means is manually operated.

4. The invention according to claim 1 in which each of said rocket actuators comprises a propellent charge and an ignition primer adapted to ignite said propellant charge within its corresponding rocket member to create said upward reactive force, when said proximity switch means is in said operative mode.

* * * * *